United States Patent Office 2,931,798
Patented Apr. 5, 1960

2,931,798

KANAMYCIN AND PROCESSES FOR THE PREPARATION THEREOF

Hamao Umezawa, Kenji Maeda, and Masahiro Ueda, Tokyo, Japan

Application December 16, 1957, Serial No. 703,096

Claims priority, application Japan September 5, 1956

10 Claims. (Cl. 260—210)

This invention relates to a new and useful substance called kanamycin, and to its production. More particularly, it relates to processes for its production by fermentation and methods for its recovery and purification. The invention embraces this antibacterial agent and its acid addition salts in dilute solutions, as crude concentrates, as purified solids and in pure crystalline forms. This substance is effective in inhibiting the growth of Gram-positive, Gram-negative and acid-fast bacteria. This substance is nontoxic and exhibits a therapeutic effect on mice infected with Gram-positive and Gram-negative bacteria. This substance also exhibits a therapeutic effect on infections of virulent tubercular bacilli in mice and guinea pigs. These substances are useful in cure of bacterial infections in humans, e.g. pneumonia, tuberculosis.

This application is a continuation-in-part of our prior, copending application Serial Number 677,965, filed August 13, 1957, which is now abandoned.

There is now provided, according to the present invention, an antibiotic substance effective in inhibiting the growth of Gram-positive bacteria, Gram-negative bacteria and mycobacteria selected from the group consisting of kanamycin A and kanamycin B and acid addition salts thereof, each of said kanamycins being a substance which is soluble in water and substantially insoluble in n-butanol, ethyl acetate, butyl acetate, ether, chloroform and benzene, which forms salts with acids, which exhibits no absorption of ultraviolet light from 220 m$\mu$ to 400 m$\mu$, which gives a positive reaction to ninhydrin reagent dissolved in pyridine and positive Molisch and Elson-Morgan reactions and negative Tollens, Sakauguchi, Fehling, maltol and Selinwanoff reactions, which contains only the elements carbon, hydrogen, oxygen and nitrogen, which contains free primary amino groups, which is dextro-rotatory in water and which exhibits characteristic absorption bands in the infra-red region of the spectrum when pelleted in the form of the free base in potassium bromide at the following wave lengths in microns: 2.96, 6.35, 6.48, 6.85, 7.25, 7.45, 7.86, 8.08, 9.65 and 10.4; further properties of said kanamycins being that kanamycin A base has the empirical formula $C_{18}H_{34-36}N_4O_{11}$, exhibits $[\alpha]_D^{24}$ +146° (c=1, 0.1 $NH_2SO_4$), gives a salicylidene derivative melting at 272–274° C. with decomposition, gives desoxystreptamine on strong acid hyhydrolysis, gives a product with an ultraviolet absorption spectrum identical to that of furfural on treatment with 40% sulfuric acid from 100 minutes at 100° C. and exhibits additional characteristic absorption bands in the infra-red region of the spectrum when pelleted in the form of the free base in potassium bromide at the following wave lengths in microns: 2.86, 2.93, 3.01, 3.03, 3.15, 3.22, 3.67, 6.23, 6.75, 6.93, 7.10, 7.33, 7.57, 7.63, 7.75, 7.82, 7.90, 7.95, 8.19, 8.43, 8.55, 8.68, 8.79, 8.90, 9.00, 9.20, 9.47, 9.85, 10.08, 10.63, 10.95, 11.25, 11.35, 11.50, 11.73, 11.95, 12.28, 12.48, 12.77 and 13.05; and that kanamycin B base exhibits $[\alpha]_D$ +135° (c=0.63 in water), gives a salicylidene derivative which decomposes without melting at 255–265° C., fails to give a product with an ultraviolet absorption spectrum identical to that of furfural on treatment with 40% sulfuric acid for 100 minutes at 100° C. and exhibits additional characteristic absorption bands in the infra-red region of the spectrum when pelleted in the form of the free base in potassium bromide at the following wave lengths in microns: 3.44, 6.74, 8.28, 8.76, 9.55 and 11.15.

Referring to the drawings.

There is further provided according to the present invention a process for the production of the antibiotic kanamycin which comprises cultivating a strain of *Streptomyces kanamyceticus* in an aqueous carbohydrate solution containing a nitrogeneous under submerged aerobic conditions until a substantial amount of kanamycin is accumulated in said solution.

The organism producing the antibiotic of the present invention was isolated from a sample of soil collected in Nagano Prefecture, Japan, and is a new species, designated *Streptomyces kanamyceticus*, of the genus Streptomyces. A culture of the living organism isolated from the soil and given the laboratory designation K2–J has been deposited in the American Type Culture Collection, Washington, D.C., and added to its permanent collection of microorganisms as A.T.C.C. 12853.

*Streptomyces kanamyceticus* has the following characteristics:

(1) Microscopic observation: Substrate mycelium is about 1$\mu$ in width and branched. The aerial mycelium developed from submerged mycelium branches and bears the sporophores at the end. Spirals and whorls are not usually observed.

(2) Glycerol-Czapek agar (27° C.): The growth is colorless at first, lemon yellow later. The reverse side is hay-colored. Aerial mycelium is white to yellow, occasionally with greenish or faint pinkish tinge. A faint brown soluble pigment occurs occasionally.

(3) Krainsky's glucose asparagine agar (27° C.): Growth is colorless to yellow. The reverse side is white, faint pinkish white, yellow or hay-colored. Aerial mycelium is scant, usually developing from center of the colony and is white, faint pinkish white, faint greenish yellow, or yellow. No soluble pigment is usually found.

(4) Calcium malate agar (27° C.): Same as on Krainsky glucose asparagine agar, but growth is slighter. Sometimes there is no growth.

(5) Starch plate (27° C.): Almost same as Krainsky glucose asparagine agar, but growth is restricted and there is no aerial mycelium. Starch is hydrolyzed.

(6) Potato plug (27° C.): Growth is wrinkled, granular surface, faint yellowish brown to yellow. Aerial mycelium is none or scant and white. There is no soluble pigment. Plug beneath the growth is occasionally dark.

(7) Carrot plug (27° C.): Growth is usually scant. When grown, it is almost the same as on potato plug.

(8) Peptone water with 0.2% sodium nitrate (27° C.): Surface ring growth is colorless to white yellow, and white growth at bottom. White aerial mycelium occasionally occurs. Nitrite is formed from nitrate. There is no soluble pigment.

(9) Peptone-meat extract agar (37° C.): Growth is wrinkled, white to yellow. There is no aerial mycelium or soluble pigment.

(10) Blood agar (37°C.): Growth is wrinkled, reddish brown with grayish tinge. There is no aerial mycelium or soluble pigment.

(11) Milk (37° C.): There is almost no change and growth is not usually observed at surface.

(12) Loeffler's coagulated serum (37° C.): Growth is restricted, white to lemon yellow. There is no aerial mycelium or soluble pigment.

(13) Egg medium (37° C.): Growth is wrinkled. There is no aerial mycelium.

(14) Gelatin: Liquefied; no soluble pigment.

(15) Utilization of carbon sources: The following carbon sources were utilized on Czapek salt basal medium: arabinose, dextrin, fructose, galactose, glucose, glycerol, maltose, mannitol, mannose, raffinose, starch, sucrose, succinate. Carbon sources not utilized: inositol, inulin, lactose, rhamnose, sorbose, xylose, acetate. Carbon sources utilized poorly: esculin, salicin, sorbitol, citrate.

(16) Production of the antibiotic, kanamycin.

The above characteristics are sufficient to distinguish the microorganism from the hitherto described species of streptomyces and to show that the strain K2–J belongs to a novel species. Variation or mutation of the above-described organism is naturally expected since such is a common property of streptomycetes.

The characteristics of this species may be summarized as follows: The growth of the colony is colorless to yellow with or without greenish or pinkish tinge. The reverse side of the colony on synthetic agar is colorless, white, faint pinkish white, whitish yellow or hay-colored. The aerial mycelium is white to yellow and spirals and whorls are not formed. A faint brown soluble pigment is produced occasionally on a synthetic medium. Gelatin is liquefied and starch is hydrolyzed.

*Streptomyces kanamyceticus* includes the typical strain No. K2–J described above and all natural and artificial variants or mutants thereof.

*S. kanamyceticus* when grown under suitable conditions produces kanamycin. A fermentation broth containing kanamycin is prepared by inoculating spores or mycelia of the kanamycin-producing organism into a suitable medium and then cultivating under aerobic conditions. For the production of kanamycin cultivation on a solid medium is possible, but for production in large quantity cultivation in a liquid medium is preferable. The temperature of the cultivation may be varied in a wide range, 25°–35° C., within which the organism may grow, but the temperature of 27°–32° C. is preferable. In the submerged aerobic fermentation of the organism for the production of kanamycin, the medium contains as the source of carbon a commercially available glyceride oil or carbohydrate such as starch, glucose, glycerol, maltose, dextrin, sucrose, lactose, etc. in pure or crude states, and as the source of nitrogen an organic material such as soybean meal, distillers' solubles, peanut meal, cotton seed meal, meat extract, peptone, fish meal, yeast extract, corn-steep liquid, etc., and, when desired, inorganic sources of nitrogen such as nitrates and ammonium salts and mineral salts such as sodium chloride, potassium chloride and magnesium sulfate and buffering agents such as calcium carbonate or phosphates and trace amounts of heavy metal salts; such medium ingredients include those listed in Canadian Patent 513,324 and in British Patents 30,341 and 736,325 and in U.S. Patents 2,691,618, 2,658,018, 2,653,899, 2,586,762, 2,516,080, 2,483,892, 2,609,329 and 2,709,672. In the deep aerated submerged culture an antifoam such as liquid paraffin, fatty oils or a silicone is used. Generally the cultivation is continued until a sufficient quantity of kanamycin is accumulated in the medium. It requires in the deep aerated submerged culture, in general, two to seven days. The kanamycin is found in the liquid portion of the fermentation broth.

EXPERIMENTAL METHODS

Shake culture: 150 ml. of the medium was placed in a flask of 500 ml. volume and sterilized. It was inoculated with the mycelia and spores of the kanamycin-producing organism grown on an agar medium or with mycelium obtained from a 48-hour shake culture and then cultured on the reciprocating shaking machine (120 strokes per minute and 8 cm. amplitude) at 27°–29° C.

Tank culture: A stainless steel fermenter of 400 liter volume was used. One hundred eighty liters or two hundred liters of the medium was placed therein and sterilized at 120° C. for 20 to 30 minutes. The aeration rate was 200 l. of air per minute and the r.p.m. of the stirrer was 200. Silicone, soybean oil or liquid paraffin was used as the antifoam.

Cylinder plate methods of determining kanamycin concentration:

Kanamycin was determined by the cylinder plate method similar to that used for the determination of streptomycin. *B. subtilis* PCI 219 was used as the testing organism and the solution containing 40 mcg./ml. or 10 mcg./ml. of kanamycin was put in the cylinders.

Kanamycin is also determined by the following cylinder plate method with Mycobacterium 607. This organism was shake-cultured in glycerol broth for 10 days at 27°–29° C. The medium for the cylinder plate method contained 1.0% glycerol, 1.0% meat extract, 1.0% peptone, 1.5% of a 0.5% solution of malachite green, 0.2% sodium chloride and 2.0% agar (pH adjusted to 7.0). The seed agar was prepared by adding the shake-cultured broth of Mycobacterium 607 to the melted agar at 45° C. at 5%. Other steps are similar to the procedure for the determination of streptomycin potency.

PRODUCTION OF KANAMYCIN BY FERMENTATION

*Streptomyces kanamyceticus* (K2–J) was first cultured in shake flasks in the following media: (*a*) 0.75% meat extract, 0.75% peptone, 0.3% NaCl, with 1.0% of starch, dextrin, maltose, glucose, lactose, sucrose or glycerol; or (*b*) 2.0% soybean meal, 0.05% KCl, 0.05% $MgSO_4 \cdot 7H_2O$, 0.5% NaCl, 0.2% $NaNO_3$, with 1.0% of starch, dextrin, maltose, glucose, lactose, sucrose or glycerol. The initial pH of all media was adjusted to 7.0. After 24–48 hours shaking in some cases the pH decreased to about 6.0–6.8, but from 72–120 hours the pH rose and became 7.5–8.6. The production of kanamycin was apparent after 48 hours and, depending on the media, the maximum production was found after 72–120 hours. The yield was highest with starch or dextrin, intermediate and about the same with sucrose, glucose, maltose and lactose and poorest with glycerol. Kanamycin was produced by media containing soybean meal, peanut meal, cotton seed meal, corn steep liquor, peptone, yeast extract or meat extract, with or without sodium nitrate. Commercially available soybean meal was recognized to be one of the best nitrogen sources. The addition of corn steep liquor, peptone, yeast extract or nitrate to the soybean meal promoted the production of kanamycin.

In the above medium (*b*) containing 2.0% starch, after three days of culture in shake flasks the pH rose to 8.2 and 250 mcg./ml. of kanamycin was produced. In tank culture with the medium containing 2.0% starch, 0.5% glucose, 1.2% soybean meal, 0.05% KCl, 0.05% $MgSO_4$, 0.1% $K_2HPO_4$, 0.3% NaCl, 0.3% peptone and 0.3% $CaCO_3$, the pH at the beginning was slightly lowered (6.6) and then increased to 8.0 after 43 hours; 273 mcg./ml. of kanamycin was produced after 78 hours.

In summary, the production of kanamycin in synthetic media was low or substantially zero; kanamycin was produced in media which contained organic nitrogen sources such as soybean meal, cotton seed meal, peanut meal, meat extract, peptone, corn steep liquor or yeast extract;

kanamycin was produced in media containing starch, dextrin, maltose, glucose, sucrose, lactose or glycerol as the carbon source; the combination of starch and soybean meal was found to be one of the best for the production of kanamycin; the addition of corn steep liquor, peptone, yeast extract or nitrate to this combination promoted the production of kanamycin; the addition of magnesium sulfate, manganese chloride, or zinc sulfate was promotive; the maximum yield was obtained when the pH of the culture broth became weakly alkaline.

The following examples illustrate the preparation of fermentation broth containing the antibiotic.

Example 1

Glucose, glycerol, lactose, maltose, sucrose, starch or dextrin was added at 2.0% to the basal medium containing 0.75% meat extract, 0.75% peptone, and 0.3% sodium chloride and sterilized and the pH after the sterilization was adjusted to 7.0. The medium was inoculated with one loopful of a glycerol Czapek agar slant of *Streptomyces kanamyceticus* and shake-cultured at 27°–29° C. The production of kanamycin was determined by the cylinder plate method with Mycobacterium 607, and the following results were observed:

| Carbon Source | Maximum Production of kanamycin, mcg./ml. | Final pH and number of days of shaking culture to attain maximum production |
|---|---|---|
| | | Days |
| starch | 250 | 7.8    5 |
| dextrin | 200 | 8.0    5 |
| maltose | 130 | 7.8    4 |
| glucose | 200 | 8.2    4 |
| lactose | 100 | 8.6    4 |
| sucrose | 100 | 8.4    4 |
| glycerol | 100 | 8.0    4 |

When a carbohydrate as indicated was added to the basal medium containing 1.0% soybean meal, 0.05% KCl, 0.05% $MgSO_4 \cdot 7H_2O$ and 0.3% NaCl, the following results were observed:

| Carbon Source | Maximum Production of kanamycin, mcg./ml. | Final pH and number of days of shaking culture to attain maximum production |
|---|---|---|
| | | Days |
| starch | 250 | 7.6    4 |
| dextrin | 250 | 8.0    4 |
| maltose | 130 | 7.8    4 |
| glucose | 100 | 8.2    4 |
| sucrose | 150 | 8.4    4 |
| lactose | 100 | 8.4    3 |
| glycerol | 70 | 8.2    4 |

Example 2

The medium containing 2.0% starch, 1.2% soybean meal, 0.05% KCl, 0.05% $MgSO_4 \cdot 7H_2O$, 0.1% $K_2HPO_4$, 0.3% NaCl, 0.3% peptone and 0.5% $CaCO_3$ (the initial pH was 7.0), was inoculated with the growth of a sellected subculture of *S. kanamyceticus* (strain K2–J) on glycerol Czapek agar and cultured. After four days of shake culture the pH was 8.2 and assays by the cylinder plate method with both *B. subtilis* and Mycobacterium 607 indicated the production of 550 mcg./ml. of kanamycin.

Example 3

The medium (180 l.) containing 2.0% starch, 1.0% glucose, 1.2% soybean meal, 0.3% NaCl, 0.05% KCl, 0.05% $MgSO_4 \cdot 7H_2O$, 0.1% $K_2HPO_4$, 0.2% $CaCO_3$, 0.3% $NaNO_3$, 0.002% $MnSO_4 \cdot 7H_2O$ and 0.002% $ZnSO_4 \cdot 7H_2O$ was placed in a fermenter of 400 l. volume, adjusted to pH 7.4, sterilized for 30 minutes at 120° C., inoculated with 1000 ml. of 40 hour shake-cultured broth of *S. kanamyceticus* (a selected subculture of K2–J strain) and tank-cultured at 27°–29° C. As antifoam, soybean oil (0.04%) and silicone (0.04%) were added. The results were as follows:

| Hrs. | pH | kanamycin, mcg./ml. | Reducing sugar percent in liquid | $NH_3$—N, mg. percent in liquid |
|---|---|---|---|---|
| 0 | 6.6 | | 2.20 | 2.5 |
| 24 | 6.9 | | 1.50 | 10.7 |
| 36 | 7.6 | 150 | 0.4 | 1.2 |
| 48 | 7.6 | 200 | 0.3 | 1.2 |
| 60 | 8.0 | 220 | 0.3 | 6.0 |
| 72 | 8.2 | 210 | 0.25 | 12.0 |

Example 4

The medium (200 l.) containing 2.0% starch, 1.0% soybean meal, 0.05% KCl, 0.05% $MgSO_4 \cdot 7H_2O$, 0.3% NaCl, 0.2% $NaNO_3$ was placed in the 400 liter fermenter, the pH was adjusted to 7.5, and the medium was then sterilized (pH after the sterilization was 7.0), and further handled as in case of the Example 3. The broth after 48 hours was found to contain 250 mcg./ml. of kanamycin. Thereafter, the concentration of kanamycin in the broth was not markedly changed. After 65 hours of the fermentation, the broth was filtered. Thus 160 liter of filtered broth was obtained. The filtered broth contained 150 mcg./ml. of kanamycin and the pH was 8.2. The filtrate was passed through a cation exchange resin column. The column was 15 cm. in diameter and contained 6 l. of IRC–50 in the sodium form (i.e. regenerated with sodium hydroxide) at pH 8.0. Amberlite IRC–50 is a commercially available cation exchange resin of the carboxylic type; it is a copolymer of methacrylic acid and divinyl benzene. The filtrate was passed through the column at the rate of 16 l./hour. In the effluent no antibacterial activity against Mycobacterium 607 was detected by the cylinder plate method. The column was then washed with about 10 liter of distilled water which was passed through the column at the same speed as the broth filtrate. Thereafter, 1 N HCl was passed through the column at the rate of 0.8 l./hour. The eluate was collected in 2 l. portions (cuts). After the 7th cut the eluates became acidic and the kanamycin was found in the 7th–10th cuts inclusive. The cuts containing kanamycin were combined and the combined solution (8 l. in volume) was adjusted to pH 6.0 with 10% NaOH, and concentrated (by distillation under vacuum at about 50° C.) to 3000 ml. The concentrated solution was freeze-dried. The brownish white powder of 500 g. thus obtained contained 8 g. of kanamycin. It was dissolved in 2 l. of methanol and, after the insoluble part was removed, acetone (20 l.) was added and 80 g. of the brownish white powder was obtained. This powder contained 8 g. of kanamycin. Twenty grams of this powder were dissolved in 40 ml. of distilled water and saturated aqueous ammonium reineckate solution was added. The light pinkish precipitate which first appeared and which weighed 50 mg. was removed, and more ammonium reineckate solution was added until no more precipitate formed. This pinkish precipitate was collected and recrystallized from distilled water, and crystalline pink kanamycin reineckate (300 mg.) was obtained. It darkened at 191°–193° C. and decomposed at 211–213° C. The light pinkish precipitate which first appeared also contained kanamycin.

EXTRACTION AND PURIFICATION OF KANAMYCIN

Extraction: Kanamycin and its hydrochloride or sulfate are soluble in water, and are found in the liquid portion of *s. kanamyceticus* fermentation broths, i.e. not in the mycelium. No substantial amount of kanamycin is transferred from the cultured liquid into butanol, ethyl acetate, butyl acetate, ether, chloroform or benzene. When *S. kanamyceticus* fermentation broths were shaken with the above solvents, no activity against Mycobacterium 607 was transferred into the organic solvents at pH 2–9, but a small portion of the activity against *B. subtilis* was transferred into butanol. Kanamycin is the antibiotic which is not extracted with the organic solvents as above described and which is inhibitorily active both against Mycobacterium 607 and *B. subtilis*. As later described, kanamycin can be transferred into butanol with a carrier such as lauric acid or stearic acid, but without a carrier no substantial amount of this antibiotic is transferred into the organic solvents above described.

Kanamycin is stable enough in aqueous solution to be evaporated under vacuum. Therefore, the material containing kanamycin, for instance, a fermentation broth can be concentrated by vacuum evaporation or by spray drying. From the residue thus obtained kanamycin can be extracted with water, methanol, aqueous methanol, aqueous ethanol or aqueous acetone; the addition of hydrochloric acid makes the solution of kanamycin easier. To concentrate an aqueous solution of kanamycin, an azeotropic solvent such as methanol or ethanol can be utilized to remove the water quickly. Kanamycin is adsorbed by activated carbon from aqueous solutions. The adsorption is more efficient when the pH of the aqueous solution is neutral or alkaline rather than acid. Kanamycin adsorbed on carbon was extracted from the carbon into methanol, ethanol, aqueous methanol, aqueous ethanol or aqueous acetone adjusted to about pH 2.0 with hydrochloric acid. Kanamycin has basic characteristics and is adsorbed by cation exchange resins. The adsorption of kanamycin on the cation exchange resin was made at pH about 6.0–9.0. Among cation exchange resins, those which have carboxylic acid groups are preferred to those having sulfonic acid groups as the active group. Elution from the former resins is easier than from the latter. Examples of such cation exchange resins are described in U.S. Patents 2,319,359, 2,333,754, 2,340,-110, 2,340,111, 2,528,188, and 2,541,420. A commercially available resin such as IRC–50 can be used for the extraction. Kanamycin adsorbed by the resin is eluted with aqueous hydrochloric acid, aqueous sulfuric acid, or aqueous organic solvents (for instance, 1 N HCl–10% aqueous acetone). Kanamycin adsorbed by the resin is also eluted by ammonium hydroxide. In this case, it is preferable that the adsorption pH be adjusted to about 6.0–6.5. The ion exchange resin processes here described were found to be the most efficient processes for the extraction of kanamycin from fermentation broths and to be useful for further purification.

The eluate containing kanamycin, obtained by the above process, is concentrated by vacuum evaporation or by freeze-drying. In this case, a pH of about 5–8.5, especially 6.0, is preferable, because in this pH range kanamycin is stable. Kanamycin is precipitated from the concentrated solution by adding a solvent, such as acetone, etc., in which kanamycin or its salt is substantially insoluble. Vacuum evaporation of a solution of kanamycin in methanol, aqueous methanol, ethanol or aqueous ethanol and freeze-drying of an aqueous solution also gives solid kanamycin. Such solid kanamycin can be dissolved in methanol, aqueous methanol or aqueous ethanol. Kanamycin hydrochloride is freely soluble in water, soluble in methanol and slightly soluble in ethanol. Kanamycin base is also soluble in water and methanol. When kanamycin is in the form of a salt such as the sulfate which is insoluble or only slightly soluble in methanol, it is dissolved in methanol by adding hydrochloric acid. From a methanol solution kanamycin is precipitated by the addition of the solvents such as acetone, ethanol, etc., in which kanamycin is less soluble.

The hydrochloride of kanamycin is converted to the sulfate by taking advantage of the differences of their solubilities in organic solvents, such as methanol and aqueous methanol. Thus, hydrochloride was dissolved in 50%–90% aqueous methanol; upon the addition of 50%–90% methanol saturated with ammonium sulfate, the sulfate of kanamycin precipitated.

The hydrochloride of kanamycin is also converted to the sulfate by a cation exchange resin process. It is dissolved in water and adsorbed by the resin process as above described, and eluted with aqueous sulfuric acid, and either the eluate is freeze-dried or the sulfate is precipitated from the eluate by the addition of a solvent such as methanol, ethanol, acetone, etc., in which kanamycin sulfate is insoluble. This principle is also useful for the conversion of kanamycin to other salts.

Kanamycin sulfate dissolved in water is precipitated by the addition of solvents such as methanol, ethanol, acetone, etc. in which kanamycin sulfate is less soluble. The precipitation of the sulfate with methanol from aqueous solution can be used for the recrystallization of the sulfate.

Kanamycin can be precipitated from its aqueous solution as its reineckate, helianthate, flavianate, picrate, tetradecylsulfate, dodecylbenzenesulfonate, etc., that is, as salts which exhibit low solubility in water. This process is useful for extraction or purification. For instance, a crude powder of kanamycin hydrochloride was dissolved in water and a saturated aqueous solution of ammonium reineckate was added. Kanamycin then precipitated as its reineckate. It was recrystallized from water. This reineckate can be converted to the hydrochloride or the sulfate by the cation exchange resin process as above described. Alternatively, this reineckate is dissolved in water by adding pyridine-hydrochloride acid. The pyridine reineckate which precipitates is removed and the solution is lyophilized to recover kanamycin hydrochloride which is then dissolved in methanol and precipitated by acetone. Kanamycin hydrochloride thus obtained is washer with acetone and a purified kanamycin hydrochloride is obtained.

Alumina chromatography can be used for the purification of kanamycin. Kanamycin hydrochloride is dissolved in methanol, adsorbed on alumina in a column and then eluted by methanol. The fractions containing kanamycin are combined and evaporated under vacuum and dried. Column chromatography with active carbon is also used for the purification. Kanamycin hydrochloride is dissolved in methanol, adsorbed on the column containing the active carbon and eluted with methanol. Column carbon chromatography is also carried out using an aqueous solution of kanamycin. An aqueous solution of kanamycin (pH 8.0) obtained by the repetition of the cation exchange resin process was passed through a column containing active carbon and, after washing the column with distilled water, the elution was made with 0.5 N $H_2SO_4$. The most active fraction of the eluate was added to methanol and crystalline kanamycin sulfate was precipitated.

Thus, column chromatography with cation exchange resins as well as column chromatography with alumina or active carbon can be utilized for the purification.

Kanamycin in aqueous solution is not significantly transferred into butanol, ethyl acetate, butyl acetate, benzene, etc. Extraction with these solvents can be used for the extraction of other co-existing substances and impurities.

Combinations of the above processes make possible the extraction and purification of kanamycin whether found in solution or as a solid as its base or as its salts. The following process is most useful for the extraction and purification of kanamycin from fermentation broths. After a sufficient amount of kanamycin has accumulated in the broth, the fermentation is stopped and the broth is filtered. If the particles in the broth which are large enough to be mechanically retained by the ion exchange resin have been removed, then this filtrate can be fed to the ion exchange resin tower, although it is not completely clear. The filtrate is adjusted to pH 6.0–8.0 and fed to the cation exchange resin (IRC–50) tower. The IRC–50 resin is first converted to the sodium form ("cycle") and suspended in water and the pH of this suspension is made the same as the pH of the kanamycin filtrate. The resin is used at the ratio of 5–10 mg. kanamycin per ml. of the resin. The flow rate of the filtrate is ½–⅒ of the resin volume per minute. Kanamycin is adsorbed by the resin. It is eluted with 1 N HCl or 1 N $H_2SO_4$. The pH of the effluent and the reaction with ninhydrin reagent dissolved in pyridine are helpful as well as the biological test for indication of the presence of kanamycin. If 1N $NH_4OH$ is used for the elution, it is preferable that the filtrate be adjusted to pH 6–6.5 before adsorption. The eluate is adjusted to pH 6.0 and evaporated under vacuum at about 50° C. Repetition of the cation exchange resin process with the 2–5 times diluted eluate can also be used for purification. In the case of repetition of the resin process, about 1 ml. of the resin is used per 10–30 mg. of kanamycin in the applied solution. The active eluate is concentrated, and to the concentrated solution 20 volumes of acetone are added and kanamycin is precipitated. It is dissolved in methanol at pH 2.0 with HCl, and again precipitated with acetone and dried. The purity of the white powder (solid kanamycin) thus obtained varies with the potency of the fermentation broth. When the potency of the broth is about 200 mcg./ml. the solid with or without brownish tinge usually assays about 400 mcg./ml. The powder containing kanamycin hydrochloride is dissolved in 50–90% aqueous methanol and 50–90% aqueous methanol saturated with ammonium sulfate is added; then kanamycin sulfate is precipitated. By this process kanamycin is purified and usually a powder of 500 mcg./mg. is obtained. The powder containing kanamycin hydrochloride is dissolved in methanol and purified by alumina chromatography or by carbon chromatography. The aqueous solution of kanamycin hydrochloride or sulfate is treated by carbon chromatography and the purified kanamycin hydrochloride or sulfate is obtained. The purest sulfate crystallizes by adding methanol to its aqueous solution. Kanamycin reineckate is precipitated from the aqueous solution and recrystallized from distilled water.

A very useful process for isolating pure crystalline kanamycin from fermentation broths on a large scale begins with removal of mycelium by filtration of broth which has been acidified to pH 4.5–5 with sulfuric acid. If desired this filtration is facilitated by holding the broth 12 hours at room temperature or 30 minutes at 50° C.; the thinning or increase in fluidity thus produced is attributed to the action of the enzymes present. The acid-filtered broth is then neutralized to about pH 6–7 with sodium hydroxide and absorbed on an IRC–50 resin column in the sodium form. Alternatively, the filtration is omitted and the thinned broth is diluted with an equal volume of water, put through a separator to remove particles larger than 20 mesh, neutralized and absorbed on the column.

After washing the column with water, the kanamycin is eluted with 1 N or 5% $H_2SO_4$ to provide about a ten-fold volume reduction.

Then the eluate is diluted three-fold, neutralized with ammonium hydroxide and absorbed on IRC–50 resin in the ammonium form. The kanamycin is then eluted with 0.5 N $NH_4OH$ and the eluate is concentrated to about one-sixth volume by distillation in vacuo; addition to the concentrate of one to four volumes methanol followed by pH adjustment to 8.2–8.4 by addition of sulfuric acid precipitates solid kanamycin sulfate.

NATURE OF KANAMYCIN

Kanamycin is obtained as its hydrochloride which is white, hygroscopic and amorphous. Its sulfate is obtained as a white amorphous powder or in crystalline form. The free base of kanamycin is obtained from these salts, for instance, by removing the sulfate ion by barium hydroxide from kanamycin sulfate solution.

Kanamycin hydrochloride is freely soluble in water, soluble in methanol, slightly soluble in ethanol, insoluble in acetone, ethyl acetate, butyl acetate, benzene, ether or petroleum ether.

Kanamycin sulfate is freely soluble in water, insoluble in methanol, ethanol, acetone, ethyl acetate, and benzene.

The solubility in aqueous methanol was roughly estimated in the following manner: To an aqueous solution containing 90 mg./ml. of amorphous kanamycin sulfate 0.3, 0.4, 0.5, 0.7 or 1.0 ml. of methanol was added and, after the precipitate was removed by centrifugation at room temperature, the activity of the supernatant was determined. The results were as follows:

| Amount of methanol added | 0.3 | 0.4 | 0.5 | 0.7 | 1.0 |
|---|---|---|---|---|---|
| Percent of methanol | 23 | 28.6 | 33.3 | 41 | 50 |
| Kanamycin in the supernatant, mg./ml. | 11.75 | 7.36 | 4.18 | 1.38 | 0.69 |

Kanamycin sulfate can be obtained in colorless plate crystals. It becomes yellowish at 253° C., shrinks at 268° C., and becomes black at 276° C. An aqueous solution of 10 mg./ml. of crystalline kanamycin sulfate has pH 7.75.

Kanamycin in aqueous solution is adsorbed by cation exchange resins, e.g. IRC–50, at pH 6–9.0 and eluted with 1 N HCl.

A methanol solution of kanamycin does not show any ultraviolet absorption maxima in the range of 220–400 m$\mu$.

When paper strip chromatography was carried out (with Toyo filter paper No. 50 and 0.2% p-toluenesulfonic acid-butanol saturated with water) the Rf value of kanamycin was 0.21–0.26.

Kanamycin exhibits optical activity. When a 1.0% aqueous solution of purified kanamycin hydrochloride was tested, $[\alpha]_D^{17}$ was $+103°$ and when a 1.0% aqueous solution of kanamycin free base was tested, $[\alpha]_D^{17}$ was $+112°$, and when a 1.0% aqueous solution of crystalline kanamycin sulfate was tested, $[\alpha]_D^{23} = +121°$.

Kanamycin is more stable at neutral than acid pH. All of the activity was retained after heating at 60° C. for 30 minutes at pH 6–8. The activity was reduced to 60% after heating at 60° C. for 30 minutes at pH 2.0.

When kanamycin was heated in 40% sulfuric acid in a boiling water bath for one hour, the reaction product gave an ultraviolet absorption maximum at 280 m$\mu$ as does furfuraldehyde.

Kanamycin, when tested by the agar dilution method, showed the following antibacterial spectrum:

| Microorganisms: | Minimum concentration for complete inhibition in mcg./ml. |
|---|---|
| *S. lutea* PCI–1001 | 1.8 |
| *M. pyogenes* var. *aureus* 209–P | 2.2 |
| *M. pyogenes* var. *aureus* Terajima | 0.4 |
| *Micrococcus flavus* | 9.0 |
| *B. subtilis* PCI–219 | 4.5 |
| *B. subtilis* NRRL–558 | 4.5 |
| *B. subtilis* Tracy | 9.0 |
| *E. coli* | 2.2 |
| *S. paratyphi* A | 3.1 |
| *S. dysenteriae* | 1.6 |
| *Proteus vulgaris* | 6.2 |
| *Mycobacterium* 607 | 3.1 |
| *Mycobacterium phlei* | 2.2 |
| *Saccharomyces sake* | >300 |
| *Saccharomyces cerevisiae* | >300 |
| *Candida albicans* | >300 |
| *Aspergillus niger* | >300 |

In Kirchner's medium it inhibited *Mycobacterium tuberculosis* $H_2$ strain at 2 mcg./ml. Streptomycin-resistant *E. coli* and streptomycin-fast *Mycobacterium tuberculosis hominis* was sensitive to kanamycin.

Mice tolerated the intravenous injection of 150 mg./kg. $LD_{50}$'s I.V. in mice, rats and rabbits were 150–250 mg./kg. Mice tolerated daily subcutaneous injection of 200 mg./kg. for 30 days. No side reactions were observed on daily injection of 100–200 mg./kg. of kanamycin in dogs for 30 days. Intraperitoneal injection of more than 50 mcg./mouse every four hours protected mice infected with 10,000 MLD of *Diplococcus pneumoniae* or 1,000 MLD of *Salmonella typhosa*. Daily subcutaneous injection of 100 mg./kg. of kanamycin showed the inhibitory effect on mice infected with *Mycobacterium tuberculosis* (Ravenel strain).

Among known antibiotics, neomycin B and C, neamine, and catenulin have some characteristics in common with kanamycin. But the following characteristics differentiate kanamycin definitely from these antibiotics. Paper chromatography with 2.0% p-toluenesulfonic acid in butanol saturated with water differentiates kanamycin from neamine. When the Toyo filter paper No. 50 was used, the R*f* value of kanamycin was 0.21–0.26, and that of neamine was 0.75–0.85. By the broth dilution method, kanamycin inhibited the growth of *Klebsiella pneumoniae* at 3 mcg./ml., neamine at 25 mcg./ml., neomycin B at 3 mcg./ml., catenulin at 1.5 mcg./ml. By the cylinder plate method with *B. subtilis*, to produce inhibition 20 mm. in diameter, 30 mcg./ml. of kanamycin, 25 mcg./ml. of neamine, 170 mcg./ml. of neomycin B, 250 mcg./ml. of neomycin C or 18 mcg./ml. of catenulin was required. These characteristics as well as the property of low toxicity and empirical formulae confirmed the fact that kanamycin is different from the neomycins, neamine and catenulin and is a new antibiotic. After heating kanamycin in 1 N HCl at 100° C. for four hours, kanamycin lost its antibacterial activity and, being different from neomycins, neamine could not be isolated.

The fundamental characteristics of kanamycin described above may be utilized to extract kanamycin from raw materials, to get kanamycin in more purified state from the crude state, to concentrate it, to remove all or part of the impurities from materials containing kanamycin, to get kanamycin into completely purified states, or to convert materials containing kanamycin into forms in which it may be more easily purified.

As the starting material for the production of kanamycin, fermentation broths as described above or crude products obtained by the treatment of the fermentation broths may be employed.

For the purpose of extraction and purification of kanamycin, for example, differences in the solubilities of kanamycin in various solvents, affinities of kanamycin for adsorbents, degree of dissociation, ability of kanamycin to form salts and distribution of kanamycin between two solvents are utilized. Differences of kanamycin in these properties from the coexisting impurities may be utilized. Actual operations to utilize such differences include, for example, separation by ion exchange resin, separation by adsorbents such as alumina or carbon, solution, extraction, precipitation with solvents, precipitation as insoluble salts, concentration by evaporation, drying or freeze-drying, or concentration by evaporation in the azeotropic state. In the production of the desired product from the raw materials any one of these operations or combinations of these operations may be employed either in single state or in plural states as described.

Recovery of kanamycin employing operations as described will be set forth in detail below for the purpose of illustration without intention to limit the present invention thereto.

When the active substance is to be recovered from culture broth containing mycelium, the broth is conveniently evaporated under vacuum or spray dried and from the residue kanamycin is extracted into solvents in which kanamycin is soluble.

When the culture broth is filtered first, kanamycin is found in the filtrate. Kanamycin in the filtrate is recovered and separated from impurities by using differences of their affinities for adsorbents such as ion exchange resins, active carbon, etc. Kanamycin in solution as in water, methanol, aqueous methanol, aqueous ethanol, etc. may be recovered, for instance, by distilling off the solvent or by the addition of the solvents in which kanamycin is less soluble.

Kanamycin dissolved in solvents is recovered and separated from impurities by the differences of their affinities for adsorbents such as alumina, carbon or ion exchange resins.

Solid materials containing kanamycin may be washed with solvents such as ethanol, acetone, ether, etc. in which kanamycin is substantially insoluble in order to remove impurities.

The basic nature of kanamycin is utilized not only for the process of extraction and purification of kanamycin by cation exchange resins but also for purification by conversion to the salts such as reineckate, helianthate, etc.

Water-insoluble salts of kanamycin such as the reineckate are precipitated from the aqueous solution. Dialysis or electrophoresis may be also utilized for the separation of kanamycin from some impurities, but such complicated operations are usually unnecessary.

Examples will be set forth below. However, it will be understood from the foregoing that the present invention is not limited to processes shown in the examples. Since the characteristics of kanamycin are disclosed herein, it will be obvious that it is possible to adopt various variations or modifications which are not concretely described herein.

Example 5

*S. kanamyceticus* (a selected subculture of K2–J strain) was inoculated to 200 l. medium placed in a 400 l. stainless steel fermenter and fermented. The medium contained starch 2.0%, glucose 1.0%, soybean meal 1.2%, NaCl 0.3%, KCl 0.05%, $MgSO_4 \cdot 7H_2O$ 0.05%, $K_2HPO_4$ 0.1%, $CaCO_3$ 0.2% and peptone 0.3%. The pH of the medium after sterilization was 7.0. Soybean oil was added to the medium at 0.1% as an antifoam. After sixty-five hours of aerated deep culture, the broth contained 220 mcg./ml. of kanamycin. The pH was 8.0. It was filtered and 170 l. of the filtrate was obtained (210 mcg./ml.). It was passed through the cation exchange resin tower. The resin tower contained 6 l. of IRC–50 resin in the sodium cycle at pH 8.0 and was 15 cm. in diameter. The rate of flow was 30 l./hour, that is, 1/12 liter of resin volume per minute. Thereafter, 30 l. water was passed through the resin tower at the rate of 30 l./hour. Kanamycin adsorbed by the resin was then eluted with 1 N HCl, the flow rate being 3.0 l./hour. The first eluate (6.5 l.) contained no activity; the following eluate contained kanamycin. Ninety percent of the adsorbed kanamycin appeared in the eluate, the pH of which was higher than 2.0. The active eluate (16 l.) was adjusted to pH 7.5 with 10% NaOH. It was then diluted to 80 l. The yield here from the broth filtrate was 83%. The diluted solution was passed again through a resin column. The column contained from 2 l. of IRC–50 resin in the sodium cycle at pH 7.5. The diameter of the column was 5 cm. The rate of the flow was 10 l./hour. The column was washed with 20 l. of water at a rate of flow of 10 l./hour. The adsorbed kanamycin was then eluted with 1 N HCl. The rate of flow was 3.0 l./hour. As in the previous elution kanamycin appeared in the eluate, the pH of which was higher than 2.0. The active eluate (4.5 l.) was adjusted to pH 6.0 by the addition of the anion exchange resin, IR–4B, in the hydroxyl form. Amberlite IR–4B is a commercially available weakly basic anionic exchange resin of the type described in U.S. Patent 2,591,573. It was evaporated under vacuum at about 40° C. to 500 ml. To this concentrated solution 5 liters of methanol was added and the insoluble part was removed. The filtrate was evaporated under vacuum at about 40° C. to 250 ml. and to the concentrated solution 2.5 liters of acetone was added and 65 g. kanamycin was obtained as a light brownish powder. The potency of this powder was 350 mcg./mg.

Example 6

The brownish white kanamycin (5 g.) obtained in Example 5 was dissolved in 50 ml. of 60% aqueous methanol, insoluble material was removed and to the filtrate 40 ml. of 60% aqueous methanol containing 2000 mg. of ammonium sulfate was added, and the precipitated kanamycin sulfate was collected, washed with 50 ml. of 80% aqueous methanol, and dried. Thus 4.5 g. of kanamycin sulfate was obtained as a light brownish powder. The potency was 370 mcg./mg.

Example 7

Ten grams of solid kanamycin hydrochloride, the potency of which was 535 mcg./mg., was dissolved in 100 ml. of 90% aqueous methanol and passed through an alumina column. The column contained 140 g. of alumina treated with sulfuric acid and was 1.5 cm. in diameter. It was developed with methanol. The first eluate of 200 ml. did not contain kanamycin. The second eluate (128 ml.) showed antibacterial activity and was evaporated under vacuum to obtain 4.681 g. of kanamycin hydrochloride as a white powder. The potency of the powder was 560 mcg./mg. By the same procedure, from the third eluate (115 ml.) 2.205 g. of solid white kanamycin hydrochloride was obtained. The potency was 615 mcg./mg. By this procedure, the yellow pigment was adsorbed by the column and the kanamycin hydrochloride was obtained as a colorless powder. The yellow pigment adsorbed by the column was eluted by the further elution with 50% aqueous methanol and distilled water.

Example 8

Four grams of solid kanamycin hydrochloride, the potency of which was 500 mcg./mg., was dissolved in 200 ml. of methanol and after evaporation to 80 ml. was passed through a column containing 5 g. of active carbon and 25 g. of cellulose powder. The column was developed with methanol. The first eluate (50 ml.) did not contain kanamycin. The second eluate (60 ml.) was evaporated to obtain 364 mg. of kanamycin hydrochloride. The potency of this powder was 720 mcg./mg. The third eluate (46 ml.) gave 381 mg. of kanamycin hydrochloride powder. The potency of this powder was 616 mcg./mg. From the fourth eluate (55 ml.) 1,873 mg. of white kanamycin hydrochloride was obtained having a potency of 483 mcg./mg. The fifth eluate (55 ml.) gave 956.6 mg. as a white powder having a potency of 410 mcg./mg. All solids here obtained were colorless.

Example 9

S. kanamyceticus was shake-cultured in a medium containing 1.0% starch, 1.5% soybean meal and 0.3% NaCl (the initial pH was 7.0) at 28° C. for four days. The culture broths in 25 flasks were combined and filtered. The pH of the filtrate was 8.2 and the filtrate contained 400 mcg./ml. kanamycin. The filtrate (3,100 ml.) was passed through an IRC–50 resin column. The column contained 100 ml. of the resin in the sodium cycle at pH 8.0. After absorption, the column was washed with 500 ml. of water, and the adsorbed kanamycin was eluted with 1 N HCl, cutting the effluent each 20 ml. The activity was included in the fourth to ninth cuts; these cuts were combined and the pH was adjusted to 6.0. This solution was concentrated by vacuum evaporation to 12 ml. and insoluble impurities were removed. To this solution saturated ammonium reineckate solution was added. The precipitate which first appeared was light pinkish colored, weighed 50 mg., contained kanamycin and was separated. To the supernatant further ammonium reineckate solution was added until no more precipitate formed. The pink precipitate was separated and dried to give 544 mg. kanamycin reineckate; about 30% of the activity was left in the supernatant. This precipitate was added to 12 ml. of distilled water, warmed to 60° C. and filtered. The filtrate was cooled and kanamycin reineckate crystals were separated. To the mother liquor kanamycin reineckate which had not been redissolved was added and after again heating to 60° C. and cooling the second crop of crystalline kanamycin reineckate was separated. This process was further repeated three times. Thus, 300 mg. of crystalline kanamycin reineckate was isolated. This crystalline reineckate (140 mgm.) was added to 105 ml. of distilled water and 2.5 N HCl in pyridine was added drop by drop until no more precipitate formed. The precipitate was removed by centrifuge, freeze-dried and washed with acetone. Thus kanamycin hydrochloride (60 mg.) was obtained as a hygroscopic white solid.

Example 10

Kanamycin hydrochloride (10 g.; 450 mcg./mg.) obtained by a process similar to that shown in Example 5 was dissolved in one liter of distilled water and the pH was adjusted to 6.4. It was added to a column of 75 ml. of IRC–50 resin in the sodium form at pH 6.4 at a flow rate of 10 ml./minute. After the column was washed with 50 ml. water, the adsorbed kanamycin was eluted by 5% $NH_4OH$. The first eluate (80 ml.) had no activity and the further eluate (130 ml.) contained kanamycin. The pH of this eluate was higher than 10.0. It was evaporated under vacuum at about 40° C. to 22 ml. The yield in this concentrated solution was 97.8%. This concentrated solution was passed through a carbon column containing 20 g. of active carbon of 100–250 mesh. The diameter of the column was 2 cm. Thereafter the column was washed with 160 ml. of distilled water and chromatographically developed with 0.5 $NH_2SO_4$. The effluent was cut in about 20 ml. portions. The kanamycin sulfate appeared from the 5th cut. The 1st–4th cuts were pH 6.2–6.4 and did not contain kanamycin. Almost all of the kanamycin was found in the 5th–8th cuts as follows: 5th cut, pH 8.2, 22.0 ml., 16.9 mg./ml.; 6th cut, pH 8.6, 23.0 ml., 65.3 mg./ml.; 7th cut 8.6, 20.0 ml., 55.0 mg./ml.; 8th cut pH 4.6, 22.0 ml., 47.5 mg./ml.; 9th cut, pH 1.0, 22.0 ml., 4.2 mg./ml. To the 6th cut 23.0 ml. of methanol was added and crystalline kanamycin sulfate was precipitated, collected and dried. Thus 1.39 g. of crystalline kanamycin sulfate was obtained. 1.2 g. of this crystalline sulfate was dissolved in 8 ml. of water and warmed to 45° C. and 6.5 ml. of methanol was added with stirring and cooling. Then, kanamycin sulfate (1.07 g.) was precipitated and was obtained in crystalline form. Microscopically it was colorless plate crystals. It did not melt below 250° C.; $[\alpha]_D^{23} = +121°$.

Kanamycin as produced by the specific procedures defined above usually consists predominately of a single specific compound, designated kanamycin A but more usually referred to simply as kanamycin. Kanamycin also contains a closely related substance which has been designated kanamycin B. Each of these forms of kanamycin is understood to have all of the biological properties and most of the chemical and physical properties described above.

Kanamycin A normally predominates in the fermentation broths set forth above but useful amounts of kanamycin B are also present therein. Much larger amounts of kanamycin B were obtained when 80 gallons inoculum of S. kanamyceticus (a selected subculture of K2–J strain) was fermented in 800 gallons of medium containing 4.5% sucrose, 2.25% soybean meal, 1.7% Pharmamedia (cottonseed endosperm flour), 0.225% debittered yeast, 0.57% $(NH_4)_2SO_4$, 1.13% $CaCO_3$, 0.02% of iron chelating agent (F+++ specific Versene) and 0.85% corn oil meal. After 95 hours' fermentation at 82° F. with aeration at 50 cubic feet per minute and stirring at 155 r.p.m. the broth contained by bio-assay 300 mcg. kanamycin/ml. of which the greater part was kanamycin B.

Pure kanamycin A is prepared by repeated recrystallization of the sulfate from methanol-water at pH 7.8–8.2. Pure kanamycin B is obtained by means of the preferential precipitation of its salt formed by reaction with a sodium salt of a sulfonated petroleum ($C_{16}$) hydrocarbon (Ultrawet, sodium dodecylbenzenesulfonate). The separation is also performed by counter current distribution (200 transfers) of the salicylidene derivative in the system methanol-water-chloroform-benzene (5–4–2–1 by volume) followed by regeneration. Mixtures of kanamycin A and B are separated by paper-strip chromatography in Peterson's n-butanol-water-2% p-toluene-sulfonic acid system on Schleicher and Schuell 589 Blue Ribbon or Whatman No. 1 papers. In this system with S & S 589 Blue Paper, kanamycin A has an $Rf$ of about 0.35 and kanamycin B has an $Rf$ of about 0.6. The presence of impurities or contaminating salts interferes markedly with the paper chromatography of the kanamycins in this system. Kanamycin A, but not kanamycin B, on treatment with 40% sulfuric acid for 100 minutes at 100° C. yields a product with an ultraviolet spectrum identical to that of furfural.

ISOLATION AND PURIFICATION OF KANAMYCIN A

*Kanamycin A sulfate.*—Kanamycin A was isolated from fermentation broths by adsorption on IRC–50 resin in the sodium cycle and elution with aqueous hydrochloric acid. The eluate was neutralized, diluted and readsorbed on IRC–50 which has been regenerated with ammonium hydroxide. The column was eluted with 0.2 N $NH_4OH$, the eluate concentrated in vacuo to approximately 50–100 mg./ml. of kanamycin activity, diluted with 0.8–1 volume of methanol and adjusted with $H_2SO_4$ to pH 8.0–8.2. Kanamycin A sulfate crystallized slowly in small irregular pale yellow prismatic crystals.

The crystalline kanamycin A sulfate was purified by repeated recrystallization from methanol-water at pH 7.8–8.2 to give white irregular prismatic crystals. This preparation contains absorbed moisture which is removed with difficulty. Samples for analytical determinations were dried to constant weight at 170° C. in vacuo.

*Analysis.*—Calcd. for $C_{18}H_{34}N_4O_{11} \cdot H_2SO_4$: C, 37.25; H, 6.25; N, 9.65; S, 5.52; $SO_4$, 16.6; neutral eq., 145.1.

Calcd. for $C_{18}H_{36}N_4O_{11} \cdot H_2SO_4$: C, 37.13; H, 6.58; N, 9.62; S, 5.50; $SO_4$, 16.6; neutral eq., 145.6.

Found: C, 37.3, 37.4, 37.3; H, 6.8, 6.6, 6.3; N, 9.3, 9.6; S, 5.5; $SO_4$, 16.8; neutral eq., 146.6.

The sulfate is soluble in water, insoluble in the common alcohols and nonpolar solvents. It shows no melting point, decomposing over a wide range above 250° C. It gave $[\alpha]_D^{24} +125°$ (c=1, N/10 $H_2SO_4$) on an anhydrous basis.

*Kanamycin A base.*—A 100 g. portion of kanamycin A sulfate in 2 l. of water was treated with IR410 (OH) resin in portions until the pH rose to 10.2. After removing the resin by filtering, the filtrate was concentrated to a volume of 300 ml. After diluting with an equal volume of methanol, stirring for 10 minutes with 10 g. of carbon (Darco G60), and filtering to remove the carbon, 600 ml. of warm ethanol was added with stirring. The slight amorphous precipitate which formed was removed by filtering. On further heating of the clear solution, crystallization began. After standing overnight, the product, kanamycin A base, was removed by filtering, washed with methanol-ethanol, ether and then air-dried. A yield of 71.6 g. was obtained; $[\alpha]_D^{24} +146°$ (c=1, N/10 $H_2SO_4$).

*Analysis.*—Calcd. for $C_{18}H_{34}N_4O_{11}$: C, 44.8; H, 7.1; N, 11.6; neut. eq. 120.6; molec. wt. 482.5. Calcd. for $C_{18}H_{36}N_4O_{11}$: C, 44.6; H, 7.5; N, 11.6; neut. eq. 121.1; molec. wt. 484.5.

Found: C, 44.7, 45.0; H, 7.40, 7.6; N, 11.0, 11.5 (Dumas); 11.8, 11.8 (Van Slyke); neut. eq., 121.5; molec. wt., 468, 444 (Rast); 427, 490 (Signer).

*Tetra-N-acetyl-kanamycin A.*—A solution of 40 g. kanamycin A base in 360 ml. methanol and 68 ml. acetic anhydride was allowed to stand overnight. The waxy precipitate which formed was recovered by filtering and washed with a 200 ml. portion of methanol. The product was then dissolved in 200 ml. $H_2O$, stirred for ½ hour with 4 g. carbon (Darco G60), filtered and the solution concentrated to dryness in vacuo. Addition of 500 ml. methanol to this residue and slight warming converted it to a crystalline product, yield 33.8 g. The material was recrystallized by dissolving in water, concentrating to a syrup in vacuo and adding excess methanol.

*Analysis.*—Calcd. for $C_{26}H_{44}N_4O_{15}$: C, 47.9; H, 6.8; N, 8.4.

Found: C, 48.5; H, 6.90; N, 8.5.

Tetra-N-acetyl-kanamycin A melted at 250–255° C. (dec.).

*Kanamycin A picrate.*—A hot solution of 5 grams of kanamycin A in 50 ml. of water was added to a boiling solution of 8 grams of picric acid in 350 ml. of water. The resulting clear solution was allowed to cool slowly to room temperature while the crystalline picrate separated out slowly from the solution. Filtering and drying afforded 11.2 grams of crude yellow crystals. This material was recrystallized by dissolving in boiling water and allowing to cool slowly to room temperature. The yellow crystals were filtered off and dried and melted with decomposition at 225–230° C.

*Analysis.*—The analytical sample was dried at 110° C. in vacuo.

Calcd. for $C_{42}H_{48}N_{16}O_{39}$: C, 36.0; H, 3.46.

Found: C, 36.2, 36.2; H, 3.62, 3.60.

*Schiff base derivatives of kanamycin A.*—To a stirred solution of 20 g. of kanamycin A in 100 ml. of water was added a solution of 14 g. of p-chlorbenzaldehyde in 150 ml. of isopropanol. When the addition had been completed, the clear solution was stirred during 15 minutes, heated to 50–60° C. and diluted with 100 ml. of water. After standing at room temperature for a few hours, the crystalline material formed was collected by filtration and dried. In this manner there was obtained 22 grams of white tetra-N-p-chlorobenzylidene-kanamycin A which after recrystallization from a methanol-water mixture had a decomposition point of 213–216° C.

*Analysis.*—Calcd. for $C_{46}H_{48}N_4O_{11}Cl_4$: C, 56.7; H, 4.96.

Found: C, 56.94, 56.74; H, 5.02, 4.73.

The tetra-p-methoxybenzylidene and tetra-salicylidene derivatives of kanamycin A were prepared in similar fashion yielding white and yellow crystalline derivatives melting at 193–196° C. (dec.) and 272–274° C. (dec.) respectively.

Kanamycin A has an empirical formula of $$C_{18}H_{34-36}N_4O_{11}$$

Treatment of kanamycin A with methanolic HCl under conditions which hydrolyze neomycin B and C to neomycin A (neamine) resulted in recovery of unchanged starting material.

Hydrolysis of kanamycin A in aqueous 6 N HCl (20 g./100 ml.) for 45 minutes at 100° C. yielded the crystalline hydrochloride of an optically inactive base which was identical with 1,3-diamino-4,5,6-trihydroxycyclohexane (desoxystreptamine) isolated from the vigorous hydrolysis of neomycin.

Figure 1:
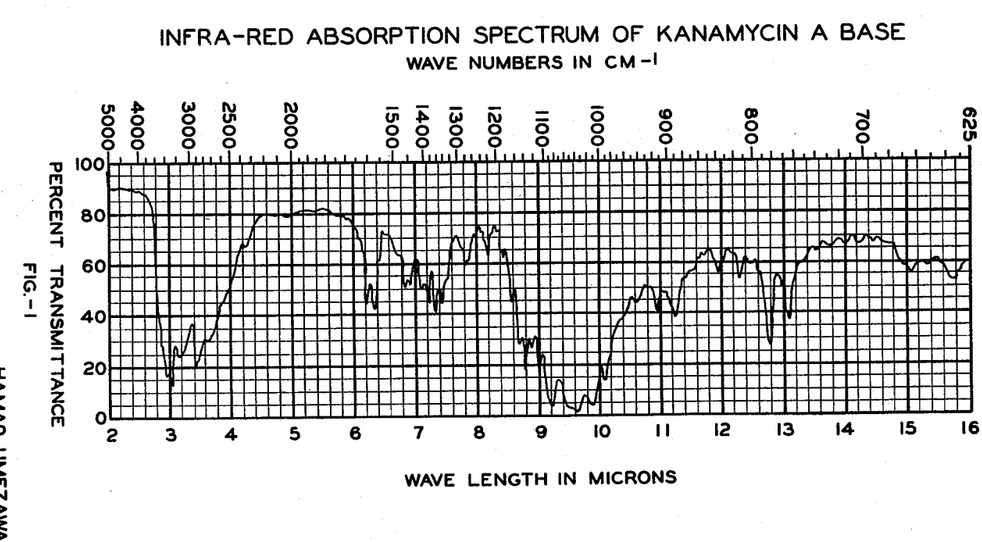
Figure 1 is a curve of the infra-red absorption spectrum of kanamycin in the free base form, and specifically in the form of kanamycin A, free base.
Figure 2:
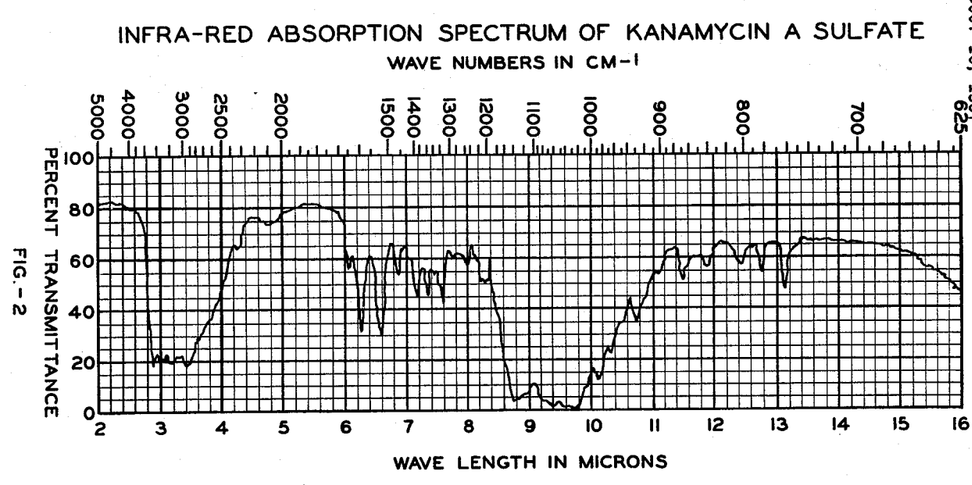
Figure 2 is a curve of the infra-red absorption spectrum of kanamycin sulfate, and specifically in the form of kanamycin A sulfate.

The wave lengths in microns of characteirstic infrared absorption maxima for kanamycin A base and sulfate when pelleted in potassium bromide after drying at 176°

C. are shown in Fig. 1 and Fig. 2 respectively and are as follows:

KANAMYCIN A

| Base | Sulfate |
|---|---|
| 2.86 shoulder | 2.88 vs |
| 2.93 vs | 2.98 vs |
| 2.97 vs | 3.03 vs |
| 3.01 vs | 3.15 vs |
| 3.03 vs | 3.20 shoulder |
| 3.15 s | 3.25 shoulder |
| 3.22 s | 3.41 vs |
| 3.67 s | 3.47 vs |
| 6.23 s | 3.60 shoulder |
| 6.35 s | 3.65 shoulder |
| 6.42 shoulder | 3.78 shoulder |
| 6.75 shoulder | 3.90 shoulder |
| 6.85 m | 4.77 m |
| 6.93 m | 6.03 m |
| 7.10 s | 6.25 s |
| 7.23 s | 6.58 s |
| 7.33 s | 6.85 m |
| 7.45 s | 7.03 shoulder |
| 7.57 shoulder | 7.15 m |
| 7.63 w | 7.33 m |
| 7.75 shoulder | 7.45 shoulder |
| 7.82 m | 7.53 shoulder |
| 7.85 shoulder | 7.58 m |
| 7.90 shoulder | 7.73 w |
| 7.95 shoulder | 8.00 m |
| 8.08 w | 8.13 shoulder |
| 8.19 m | 8.23 m |
| 8.43 m | 8.30 m |
| 8.55 s | 8.50 shoulder |
| 8.68 s | 8.62 shoulder |
| 8.79 vs | 8.77 vs |
| 8.90 s | 8.85 shoulder |
| 9.00 vs | 8.95 shoulder |
| 9.20 vs | 9.18 shoulder |
| 9.47 shoulder | 9.23 shoulder |
| 9.63 vs | 9.38 vs |
| 9.85 vs | 9.57–9.82 vs |
| 10.08 vs | 9.95 shoulder |
| 10.36 shoulder | 10.15 vs |
| 10.63 m | 10.35 s |
| 10.95 m | 10.50 shoulder |
| 11.25 m | 10.74 s |
| 11.35 shoulder | 10.88 shoulder |
| 11.50 shoulder | 11.13 w |
| 11.73 w | 11.48 m |
| 11.95 m | 11.55 shoulder |
| 12.28 m | 11.93 m |
| 12.48 w | 12.43 m |
| 12.77 s | 12.78 m |
| 13.05 s | 13.15 m |

In the table, (vs) means very strong, (s) is for strong, (m) is for medium and (w) is for weak.

ISOLATION AND PURIFICATION OF KANAMYCIN B

A solution (1500 ml.) at pH 6 of kanamycin was obtained using two absorptions on IRC–50 resin in the sodium form followed by elution with sulfuric acid. To this solution there was added 45 g. sodium dodecylbenzenesulfonate (Ultrawet K) to precipitate kanamycin B dodecylbenzenesulfonate which was collected by filtration, washed with water and dissolved in methanol. The methanol solution was then acidified with sulfuric acid, leaving dodecylbenzenesulfonic acid in solution and precipitating more than 8.5 g. kanamycin B sulfate which was substantially free of kanamycin A as indicated by its bio-assay of 732 u./mgm. and its ultra-violet (furfural) assay of 45 u./mgm.

In another experiment 50 g. solid kanamycin (456 u./mgm. by bio-assay; 131 u./mgm. by ultra-violet furfural assay; ratio of 0.287 for the two assays) was dissolved at pH 6 in 2 l. water and 60 g. sodium dodecylbenzenesulfonate (Ultrawet) was added. The precipitate was collected, water-washed and dissolved in methanol and the methanol solution was acidified with sulfuric acid to precipitate purified kanamycin B sulfate. After repetition of this process, there was obtained 9.5 g. solid kanamycin B sulfate (630 u./mgm. by bio-assay; 51 u./mgm. by furfural ultra-violet assay; ratio=0.081).

Both kanamycin A and kanamycin B were obtained in pure form by way of counter-current distribution of the salicylidene derivatives in the system methanol-water-chloroform-benzene in the ratio by volume of 5:4:2:1. Thus, kanamycin sulfate (10 g.) was dissolved in water and treated with a solution of barium hydroxide to convert it to the base by precipitating barium sulfate. The filtrate was then shaken with a solution of 8 g. salicylaldehyde in butanol and the precipitation of the Schiff's base (tetra-salicylidene derivative of kanamycin) was completed by the addition of 2 N sodium hydroxide. The butanol phase was separated, combined with additional butanol used to extract the aqueous phase, washed with aqueous sodium bicarbonate and distilled in vacuo to leave the Schiff's base as residue.

In one case, distribution using 200 transfers gave peak concentrations of the tetra-salicylidene kanamycin A at about tube 65 and the tetra-salicylidene kanamycin B at about tube 40. The contents of the tubes near these peaks were combined and the derivative therein was converted to sulfate by dissolving it in acetone and adding dilute aqueous sulfuric acid to decompose the Schiff's base and precipitate kanamycin sulfate which was then redissolved in water and precipitated by the addition of methanol-acetone (1:1) to give to kanamycin A sulfate (423 u./mgm. by bio-assay; 470 u./mgm. by furfural ultra-violet assay) and kanamycin B sulfate (936 u./mgm. by bio-assay; 25 u./mgm. by furfural ultral-violet assay). These sulfates were converted to the respective free bases by dissolving them in water, raising the pH of 3–4 to 10–10.5 with a basic anionic exchange resin, e.g. IR–410, filtering off the resin and then lyophilizing the filtrate. These kanamycin A and B bases were demonstrated by paper strip chromatography to be free of kanamycin B and A, respectively.

In another case, 10 g. kanamycin (700 u./mgm. by bio-assay; 110 u./mgm. by furfural ultra-violet assay) was converted to the salicylidene derivative and put through 300 transfers. The peak concentration of the tetra-salcylidene-kanamycin B was found in tube 63; found by analysis after drying at 110° C.: C, 61.95, 62.12; H, 6.02, 5.87. The tetra-salicylidene-kanamycin B, which decomposed at 255–265° C., was converted to kanamycin B sulfate and then to kanamycin B base according to the previous procedure. The base was then recrystallized from 95% ethanol (1000 mcg./mgm. by bio-assay; 0 mcg./mgm. by furfural ultra-violet assay).

Kanamycin B base decomposes at a considerably lower temperature than kanamycin A base; thus kanamycin B base darkens at 170° C. (corr.) and forms a dark gum on drying in vacuo at the boiling point of cymene (176° C.). Kanamycin B base exhibited $[\alpha]_D = +135°$ (c=0.63 in water) and contained by analysis 44.69% carbon and 7.48% hydrogen and 12.65, 13.62% nitrogen after correction for the 10.3% loss in weight found on drying a sample at 110° C.

Figure 3:
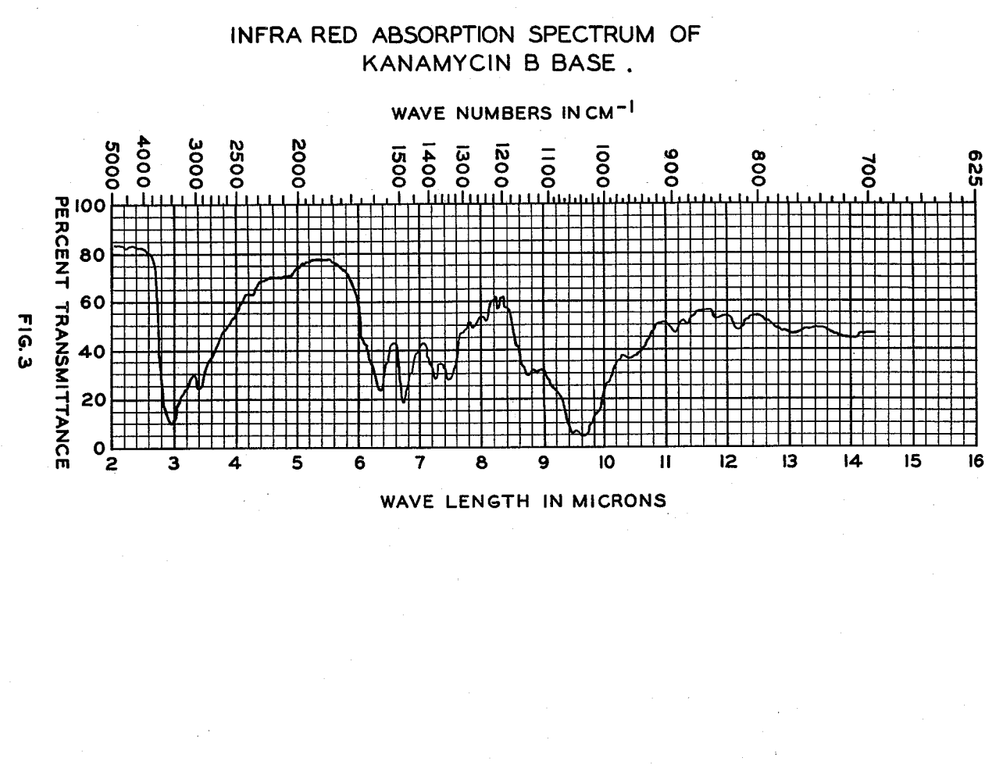
Figure 3 is a curve of the infra-red absorption spectrum of kanamycin in the free base form, and specifically in the form of kanamycin B, free base.

The wave lengths in microns of characteristic infrared absorption maxima for kanamycin B base as shown in Figure 3 when pelleted in potassium bromide after drying at 137° C. for 15 hours in vacuo are as follows: 2.96, 3.44, 6.35, 6.48 (shoulder), 6.74, 6.85 (shoulder), 7.25, 7.45, 7.86, 8.08, 8.28, 8.76, 9.55, 9.65, 10.4 and 11.15.

About 2 g. of kanamycin B base was treated with 4 ml. acetic anhydride in 20 ml. methanol. After standing overnight, crystals of product separated. Precipitation was completed by the addition of ether and the product, tetra-N-acetyl-kanamycin B was washed with more ether, recrystallized from aqueous ethanol and found to darken at 180° C. but not to melt below 280° C. Found by analysis: C, 48.64, 48.66; H, 6.64, 6.73; N, 9.82, 9.79.

Kanamycin A and kanamycin B were also separated and prepared in pure form by ion exchange resin column chromatography. A column 35 mm. in diameter and 870 mm. high was filled with 800 ml. of Amberlite IRC 50 (200 mesh) in the ammonium form and brought to equilibrium with 0.075 N NH$_4$OH. A solution of 6 g. kanamycin base (bio-assaying 580 mcg./mgm.) in 120 ml. water was passed slowly through the column followed by 0.075 N NH$_4$OH as the eluting agent. The eluate was collected at the rate of about 250–300 ml. per 24 hours in test tubes holding about 17-18 ml. The contents of each test tube were bio-assayed on pH 8 trays. Consecutive tubes having comparable activity were combined into "fractions," concentrated by distillation in vacuo and lyophilized to give solid kanamycin base which was weighed and assayed. The results may be summarized as follows:

| Fraction Number | Tube Numbers | Weight in mgms. | Potency in mcg./mgm. | |
|---|---|---|---|---|
| | | | By Bio-assay | By furfural Ultraviolet assay |
| I | 29-44 | 19 | 30 | 184 |
| II | 971-1070 | 13 | 140 | 274 |
| III | 1071-1200 | 22 | 180 | 368 |
| IV | 1201-1500 | 39 | 350 | 512 |
| V | 1501-1700 | 43 | 450 | 654 |
| VI | 1701-2000 | 531 | 660 | 734 |
| VII | 2001-2300 | 16 | 870 | 594 |
| VIII | 2301-2600 | 36 | 320 | 204 |
| IX | 2601-3000 | 47 | 330 | 212 |
| X | 3001-3400 | 42 | 640 | 144 |
| XI | 3401-3600 | 55 | 1,250 | 52 |
| XII | 3601-3940 | 548 | 1,350 | 48 |
| XIII | 3941-4200 | 405 | 1,150 | 46 |
| XIV | 4201-4500 | 175 | 1,200 | 72 |
| XV | 4501-4800 | 85 | 720 | 64 |
| XVI | 4801-5200 | 35 | 500 | 132 |
| XVII | 5201-5550 | 53 | 190 | 136 |

Thus, many of the early fractions, and particularly fraction VI, were kanamycin A base free of kanamycin B. Later fractions, and particularly fractions XI, XII, XIII and XIV were pure kanamycin B base. The absence of kanamycin A from fraction XII was confirmed by paper strip chromatography.

The two forms of kanamycin react as follows in the indicated qualitative tests:

| Test | A | B |
|---|---|---|
| Concentrated sulfuric acid | Colorless | Colorless. |
| Molisch | Slow formation of color. | Rapid formation of color. |
| Elson-Morgan | Weakly positive | Weakly positive. |
| Seliwanoff | Negative | |
| Folin and Ciocalteau | Weakly positive | Do. |
| Fishbach and Levin (HCl, Me$_2$CO) | Negative | Negative. |
| Fishbach and Levin (HCl, H$_2$O) | do | |
| Ninhydrin | Positive | |
| Reducing Sugar (ammoniacal silver nitrate) | Negative | |
| Sakaguchi | do | |
| Maltol | do | |
| Acid hydrolysis to "furfural" | Positive | Do. |

Comparison of the antibacterial properties of kanamycin A and kanamycin B gave the following results:

A. IN VITRO SPECTRUM BY THE AGAR DILUTION METHOD

| Organism | Minimum Inhibitory Concentration in meg./ml. | |
|---|---|---|
| | Kanamycin A | Kanamycin B |
| Aerobacter aerogenes | 2.8 | 1.6 |
| Alcaligenes faecalis | 3.1 | 3.1 |
| Bacillus anthracis | 1.1 | 1.2 |
| Bacillus cereus | 3.1 | 1.6 |
| Bacillus cereus var. mycoides PCI #213 | 3.1 | 0.8 |
| Bacillus circulans | 1.25 | 2.5 |
| Brucella bronchiseptica | 3.1 | 1.6 |
| Clostridium welchii | >200 | >200 |
| Diplococcus pneumoniae | 11.2 | 12.5 |
| Gaffkia tetragena | 1.25 | 0.31 |
| Lactobacillus acidophilus ATCC #4356 | 25.0 | 25.0 |
| Lactobacillus casei ATCC #4646 | 50.0 | 25.0 |
| Micrococcus flavus ATCC #10240 | 2.5 | 1.25 |
| Mycobacterium sp. #607 | 0.31 | 0.625 |
| Neisseria sp | 2.5 | 1.25 |
| Salmonella enteritidis ATCC #4432 | 1.6 | 0.8 |
| Salmonella gallinarum | 1.6 | 1.6 |
| Salmonella paratyphi A | 1.6 | 1.6 |
| Salmonella paratyphi B | 6.25 | 3.1 |
| Salmonella pullorum | 0.8 | 0.4 |
| Salmonella schottmuelleri | 12.5 | 6.25 |
| Serratia marcescens (Wisconsin) | 3.1 | 3.1 |
| Serratia marcescens (Yale) | 6.25 | 3.1 |

A. IN VITRO SPECTRUM BY THE AGAR DILUTION METHOD—Continued

| Organism | Minimum Inhibitory Concentration in meg./ml. | |
|---|---|---|
| | Kanamycin A | Kanamycin B |
| Shigella dysenteriae | 1.6 | 0.8 |
| Shigella paradysenteriae | 1.6 | 1.6 |
| Shigella sonnei | 3.1 | 6.25 |
| Streptococcus agalactiae ATCC #7077 | 25.0 | 25.0 |
| Streptococcus dysgalactiae ATCC #9926 | 3.1 | 12.5 |
| Streptococcus mitis ATCC #9811 | 100 | 50.0 |
| Streptococcus pyogenes C203 | 50 | 50 |
| Streptococcus sanguis ATCC #10556 | 50.0 | 50.0 |
| Vibrio comma | 0.8 | 0.8 |
| Corynebacterium xerosis | 1.4 | 0.4 |

B. ACTIVITY VERSUS *MYCOBACTERIUM TUBERCULOSIS*

| Organism | Minimum Inhibitory Concentration (mcg./ml.) | | |
|---|---|---|---|
| | Kanamycin A | Kanamycin B | Streptomycin |
| M. tuberculosis (H37Rv) | 0.4-0.8 | 2.0-6.0 | 0.2-0.6 |
| M. tuberculosis (H37Rv$_r$) | 0.2-0.8 | 1.4-6.0 | >2,000 |

C. TURBIDOMETRIC ASSAY

The turbidometric assay of crystalline kanamycin B gave assay values of 3880 and 4000 mcg./mg. based on kanamycin A free base. *Micrococcus pyogenes* var. *aureus* was used as the assay organism.

D. PLATE DIFFUSION ASSAY

Kanamycin B assayed against *Bacillus subtilis* by agar diffusion techniques using Kanamycin A as a standard gave the following values.

| Sample of Kanamycin B | Potency (mcg./mgm.) | Furfural Assay (mcg./mgm.) |
|---|---|---|
| B-64 | 1,000 | 0 |
| B-57 | 1,040 | 15 |
| B-65 | 1,300 | 30 |

For the purposes set forth herein use is made of kanamycin A alone, kanamycin B alone or mixtures of kanamycin A and kanamycin B. All are of approximately equal antibacterial effectiveness except against mycobacteria; in that case use of pure or nearly pure kanamycin A is preferred.

By virtue of its broad spectrum of antibacterial activity, kanamycin and its salts are useful as general disinfectants, as for glassware; use is thus made of a five percent aqueous solution of kanamycin base or sulfate.

Kanamycin is a useful agent for the treatment of mastitis in cattle or calf scours; for this purpose use is made, for example, of suspensions in vegetable oil for instillation in the teats to teat mastitis, containing 1 to 1000 mgm./ml., and preferably about 50 mgm., of the antibiotic, or enough capsules to provide a total dosage of 0.25 to 2.0 grams by oral administration as for calf scours.

The antibiotic of the present invention is a useful agent for the preservation of fresh-water and salt-water fish. Thus when dusted over the exposed surfaces of the fish, after cleaning, at the rate of 0.1 to 1000 mgm./kg. of weight of fish, the spoilage and development of odor and rancid taste in the absence of refrigeration is suppressed for many days. This is of particular importance to hunters and fishermen during warm weather. The antibiotic is applied as a solution or suspension in a liquid, e.g. water, or as a powder which may contain inert diluents such as talc and is applied by spraying, dipping or simple dusting.

Included within the scope of the present invention are acid addition salts of kanamycin with organic and inorganic acids such as hydrochloric acid, sulfuric acid, hydrobromic acid, hydriodic acid, phosphoric acid, nitric acid, citric acid, maleic acid, malic acid, tartaric acid, benzoic acid, cinnamic acid, ascorbic acid, aetic acid, picric acid, phytic acid, levopimaric-6,8a-cis-endosuccinic acid, sulfamic acid, glycolic acid and mandelic acid. For therapeutic purposes use is made of salts of nontoxic acids but salts of toxic acids, e.g. picric acid, are useful in isolation procedures, e.g. as precipitants from aqueous solutions, and for disinfectant purposes where toxicity is not important.

When desired for specific purposes and rendered pharmaceutically compatible, there may be admixed with the compounds of the present invention other medicaments such as antihistamines, sulfa drugs (e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl) sulfanilamide), liptropic agents (particularly methionine, choline, isositol and beta-sitosterol and mixtures thereof), stimulants of the central nervous system (e.g. caffeine, amphetamines), local anesthetics, analgesics (e.g. aspirin, salicylamide, sodium gentisate, p-acetylaminophenol, phenacetin, codeine), laxatives (e.g. phenolphthalein), sedatives (e.g. barbiturates, bromides), salts of penicillin (e.g. potassium penicillin G, procaine, penicillin G, 1-ephenamine penicillin G, dibenzylamine penicillin G, other salts disclosed by U.S. Patent 2,627,491; these combinations are particularly useful to enable variation of the pattern of blood levels obtained), phenoxymethylpenicillin and salts thereof, other antibiotic agents (e.g. streptomycin, dihydrostreptomycin, bacitracin, polymixin, tyrothricin, erythromycin, chlortetracycline, oxytetracyline, tetracycline, oleandomycin, chloramphenicol, magnamycin, novobiocin, cycloserine, neomycin; in some cases such combinations attack a wider range of organisms or show synergistic efficacy or provide decreased toxicity with equal efficacy), vitamins (e.g. Vitamins A, $A_1$, $B_1$, $B_2$, $B_6$, $B_{12}$ and members of that family, folic acid and members of that family, Vitamins C, $D_2$, $D_3$ and E), hormones (e.g. cortisone, hydrocortisone, 9-α-fluorocortisone, 9-α-fluorohydrocortisone, prednisone and prednisolone), anabolic agents (e.g. 11,17-dihydroxy-9-α-fluoro-17-α-methyl-4-androsten-3-one; 17-α-ethyl-19-nortestosterone) and antifungal agents (e.g. mycostatin).

We claim:

1. An antibiotic substance effective in inhibiting the growth of Gram-positive bacteria, Gram-negative bacteria and mycobacteria selected from the group consisting of kanamycin A and kanamycin B and acid addition salts thereof, each of said kanamycins being a substance which is soluble in water and substantially insoluble in n-butanol, ethyl acetate, butyl acetate, ether, chloroform and benzene, which forms salts with acids, which exhibits no absorption of ultraviolet light from 220 m$\mu$ to 400 m$\mu$, which gives a positive reaction to ninhydrin reagent dissolved in pyridine and positive Molisch and Elson-Morgan reactions and negative Tollens, Sakaguchi, Fehling, maltol and Seliwanoff reactions, which contains only the elements carbon, hydrogen, oxygen and nitrogen, which contains free primary amino groups, which is dextro-rotatory in water and which exhibits characteristic absorption bands in the infra-red region of the spectrum when pelleted in the form of the free base in potassium bromide at the following wave lengths in microns: 2.96, 6.35, 6.48, 6.85, 7.25, 7.45, 7.86, 8.08, 9.65 and 10.4; further properties of said kanamycins being that kanamycin A base has the empirical formula $C_{18}H_{34-36}N_4O_{11}$, exhibits $[\alpha]_D^{24}$ +146° (c=1, 0.1 $NH_2SO_4$), gives a salicylidene derivative melting at 272–274° C. with decomposition, gives desoxystreptamine on strong acid hydrolysis, gives a product with an ultraviolet absorption spectrum identical to that of furfural on treatment with 40% sulfuric acid for 100 minutes at 100° C. and exhibits additional characteristic absorption bands in the infra-red region of the spectrum when pelleted in the form of the free base in potassium bromide at the following wave lengths in microns: 2.86, 2.93, 3.01, 3.03, 3.15, 3.22, 3.67, 6.23, 6.75, 6.93, 7.10, 7.33, 7.57, 7.63, 7.75, 7.82, 7.90, 7.95, 8.19, 8.43, 8.55, 8.68, 8.79, 8.90, 9.00, 9.20, 9.47, 9.85, 10.08, 10.63, 10.95, 11.25, 11.35, 11.50, 11.73, 11.95, 12.28, 12.48, 12.77 and 13.05; and that kanamycin B base exhibits $[\alpha]_D$ +135° (c=0.63 in water), gives a salicylidene derivative which decomposes without melting at 255–265° C., fails to give a product with an ultraviolet absorption spectrum identical to that of furfural on treatment with 40% sulfuric acid for 100 minutes at 100° C. and exhibits additional characteristic absorption bands in the infra-red region of the spectrum when pelleted in the form of the free base in potassium bromide at the following wave lengths in microns: 3.44, 6.74, 8.28, 8.76, 9.55 and 11.15.

2. Kanamycin A free base, as defined in claim 1.

3. Kanamycin B free base, as defined in claim 1.

4. An acid addition salt of kanamycin A, as defined in Claim 1.

5. An acid addition salt of kanamycin B, as defined in claim 1.

6. Kanamycin A sulfate, as defined in claim 1.

7. Kanamycin B sulfate, as defined in claim 1.

8. A process for the production of a fermentation broth containing the antibiotic described in claim 1 which comprises cultivating a strain of *Streptomyces kanamyceticus* in an aqueous carbohydrate solution containing a nitrogenous nutrient under submerged aerobic conditions until substantial antibacterial activity is imparted to said solution and then recovering said antibiotic from said solution.

9. A process according to claim 8 wherein the antibiotic is separated from the fermentation broth by adsorption on a cation exchange resin and subsequent elution therefrom.

10. A process according to claim 8 wherein the antibiotic is separated from the fermentation broth by adsorption on a cation exchange resin of the carboxylic acid type and subsequent elution therefrom by an acid.

References Cited in the file of this patent

Waksman et al.: The Actinomycetes and Their Antibiotics, pub. 1953, by The Williams & Wilkins Co., Baltimore, Md., pp. 24–25 and 199–200.

Maeda et al.: J. of Antibiotics, vol. 9, Sec. A, March 1956, pp. 82–85.

Erickson, Annual Review of Microbiology, vol. III, pp. 23–51, page 51 is especially pertinent, 1949.

Annals of the N.Y. Academy of Sciences, 1948, vol. 60, No. 1, pp. 5 and 24.

Waksman: Bacteriological Reviews, vol. 21, March 1957, pp. 1–29, page 5 is especially pertinent.

Sneath: J. Gen. Microbiology, pp. 184–200, page 185 is especially pertinent, August 1957.

Pridham et al., Applied Microbiology, January 1958, pp. 52–79.